(12) United States Patent
Sridharan et al.

(10) Patent No.: US 11,392,419 B2
(45) Date of Patent: Jul. 19, 2022

(54) CLOUD AGNOSTIC WORKLOAD IDENTITY

(71) Applicant: salesforce.com, inc., San Francisco, CA (US)

(72) Inventors: Giridharan Sridharan, Bellevue, WA (US); Sridhar Dutta, Bellevue, WA (US); Aman Gulati, Sunnyvale, CA (US); Fiaz Hossain, San Francisco, CA (US); Vishal Agarwal, Woodinville, WA (US); Gage David Laufenberg, Oakland, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/930,900

(22) Filed: Jul. 16, 2020

(65) Prior Publication Data

US 2022/0019478 A1 Jan. 20, 2022

(51) Int. Cl.
*G06F 9/50* (2006.01)
*G06F 9/445* (2018.01)
*H04L 9/32* (2006.01)

(52) U.S. Cl.
CPC ........ *G06F 9/5072* (2013.01); *G06F 9/44589* (2013.01); *G06F 9/505* (2013.01); *H04L 9/3213* (2013.01); *H04L 9/3263* (2013.01)

(58) Field of Classification Search
CPC .... G06F 9/5072; G06F 9/44589; G06F 9/505; G06F 9/3213; G06F 9/3263
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

OTHER PUBLICATIONS

AWS Identity and Access Management (IAM), https://aws.amazon.com/iam/, accessed Jun. 5, 2020, 2 pages.

(Continued)

*Primary Examiner* — Azizul Choudhury
(74) *Attorney, Agent, or Firm* — Kwan & Olynick LLP

(57) ABSTRACT

Examples include a system and computer-implemented method to create a cloud native workload identity (CNWI) and assign the CNWI to an instance of a workload to be instantiated in a cloud computing environment of a cloud service provider (CSP); translate the CNWI into a cloud agnostic workload identity (CAWI) and assign the CAWI to the workload instance; and use the CAWI by the workload instance to communicate with other workloads in the same or a different CSP.

22 Claims, 6 Drawing Sheets

(56) References Cited

U.S. PATENT DOCUMENTS

| | | | |
|---|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,802,874 B1* | 10/2020 | Palsule ............... H04L 67/1097 |
| 11,134,013 B1* | 9/2021 | Allen ................. H04L 67/1097 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2016/0323374 A1* | 11/2016 | Russinovich ......... G06F 9/5072 |

OTHER PUBLICATIONS

IAM roles for Amazon EC2, https://docs.aws.amazon.com/AWSEC2/latest/UserGuide/iam-roles-for-amazon-ec2.html, accessed Jun. 5, 2020, 4 pages.

Kiam, https://github.com/uswitch/kiam, accessed Jun. 5, 2020, 4 pages.

Kube2iam, https://github.com/jtblin/kube2iam, accessed Jun. 5, 2020, 15 pages.

WS IAM Controller for Kubernetes, https://github.com/zalando-incubator/kube-aws-iam-controller, accessed Jun. 5, 2020, 8 pages.

* cited by examiner

CLOUD AGNOSTIC WORKLOAD IDENTITY

BACKGROUND

The field of invention relates to controlling access to computing resources, and, more specifically, to generating a cloud agnostic workload identity in a cloud computing environment.

Cloud computing services provide shared resources, software, and information to computers and other devices upon request or on demand. In cloud computing environments, software applications can be accessible over the Internet rather than installed locally on personal or in-house computer systems. Cloud computing typically involves the over-the-Internet provision of dynamically scalable and often virtualized resources. Technological details can be abstracted from end-users (e.g., client computing systems), who no longer have to develop expertise in, or control over, the technology infrastructure "in the cloud" that supports them. Some of the applications or on-demand services provided to clients can include the ability for a user to create, view, modify, store and share documents and other files.

It is desirable for cloud computing services to implement a "zero trust" architecture. Zero trust is a security concept centered on the belief that organizations (such as cloud service providers (CSPs)) should not automatically trust anything inside or outside its perimeters and instead must verify anything and everything trying to connect to its computing systems before granting access. One technique to help enforce zero trust is to associate a workload with an identity. However, workload identities are specific to a CSP and not usable across CSPs.

DETAILED DESCRIPTION

Figure 1:
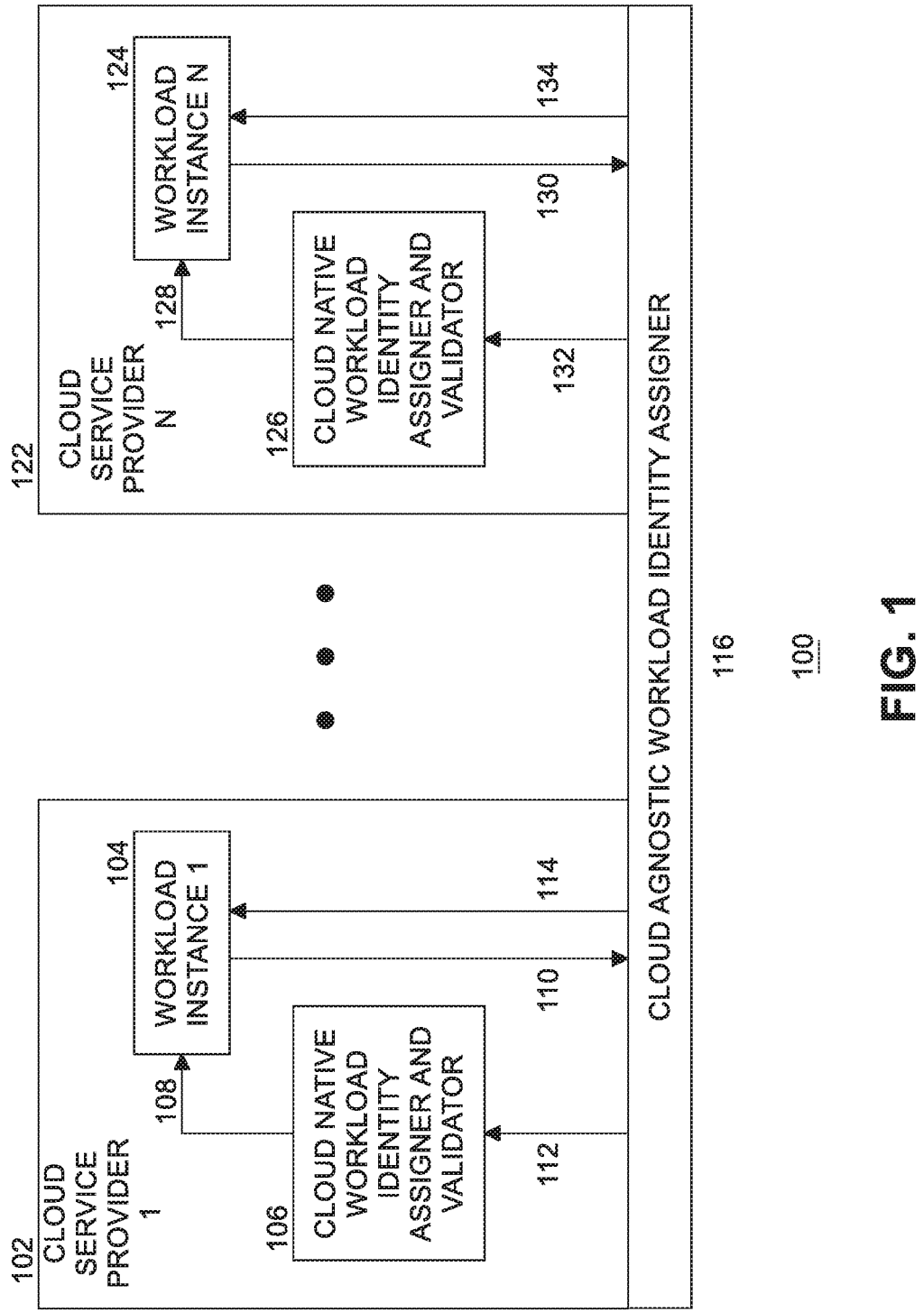
FIG. 1 illustrates a computing environment with multiple cloud service providers (CSPs) according to some embodiments.

There is a need in cloud computing environments for a way to associate an identity with a workload. Typically, this involves assigning an identity to the workload according to the characteristics and requirements of a particular CSP. As used herein, a workload is an amount of processing that a computer system has been given to do at a given time. The workload consists of some amount of application programming running in the computer system and usually some number of users connected to and interacting with the computer's applications. Workloads may also be referred to as applications or services. As used herein, an identity means cryptographically provable information which can identify a person, computer or a running workload or service, such as a symmetric or asymmetric key, digital certificate, credential, or an identity and access management (IAM) role (as used, for example in Amazon Web Services (AWS) cloud computing environments provided by Amazon.com, Inc.) attached to a running service. However, in practice each CSP (such as AWS provided by Amazon.com, Inc., Azure provided by Microsoft Corporation, Google Cloud Platform (GCP) provided by Google, Inc., Alibaba Cloud, and others), provides access to different compute engines (e.g., virtual machines (VMs), Kubernetes engines (e.g., elastic Kubernetes service (EKS), Google Kubernetes engine (GKE)), or serverless computing (e.g., AWS Lambda, Microsoft Azure Functions)), and uses a CSP-native identity (that is, one specific to the CSP), and this CSP-native identity cannot be created for one CSP and then used at another CSP. A cloud native workload identity (CNWI) as defined herein is CSP-specific and specific to what the workload (or a service) runs as in a particular CSP cloud computing environment. For example, AWS provides IAM roles but GCP provides service accounts. The CNWI is the cryptographically verifiable identity that is assigned to a workload in the CSP. The CNWI can be assigned permissions to access the CSP's native services.

Embodiments of the present invention overcome this deficiency to provide a mechanism to translate a cloud native workload identity (CNWI) into a cloud agnostic workload identity (CAWI) that can be used for the same workload across multiple CSPs (e.g., across two or more of AWS, Azure, GCP, Alibaba, and other cloud computing environments) and provide an abstraction layer such that from a workload perspective the mechanism is similar regardless of the CSP being used. The CAWI is not specific to a CSP. For example, the CAWI may be a transport layer security (TLS) certificate which is assigned to a workload so the workload can communicate with other workloads over a secure TLS connection. In an embodiment, the CAWI can be used for non-CSP specific communication and can be used across CSPs for the same workload.

In embodiments of the present invention, the level at which identity embodied as a CAWI is provided is consistent across all CSPs even though there may exist differences between the CSPs in providing such functionality. In such cases, identity services and related components as described herein provide for this capability. The layer at which unique identities are provided include Virtual Machine (VM) instances, Kubernetes pods, Lambda functions, and other constructs. A high level CAWI created and assigned during runtime based at least in part on a previously assigned CNWI allows for a consistent view of identity for a user and/or workload across CSPs. In an embodiment, a control mechanism is included to ensure there are adequate checks during assignment of those identities to ensure one workload cannot usurp another workload's identity.

FIG. 1 illustrates a computing environment 100 with multiple cloud service providers (CSPs) according to some embodiments. In the example shown in FIG. 1, there are N CSPs, where N is a natural number. In practice, there may be any number of CSPs in computing environment 100 accessible by one or more users. FIG. 1 shows CSP 1 102 . . . CSP N 122 communicatively coupled to cloud agnostic workload identity assigner 116 (e.g., coupled via one or more computer networks). For example, CSP 1 102 may be AWS provided by Amazon.com, Inc. and CSP N 122 may be GCP provided by Google, Inc. Other possible CSPs include Microsoft Azure, Alibaba, and others. Each CSP runs one or more instances of workloads for one or more users. For example, CSP 1 102 runs workload instance 1 104 and CSP N 122 runs workload instance N 124. A workload comprises any computing task performed by a CSP. A workload instance is an instantiation of a workload. In this example, workload instance 1 104 may or may not be an instantiation of the same workload as workload instance N 124. In an embodiment, each CSP includes a cloud native workload identity (CNWI) assigner and validator to assign the CNWI to a workload instance and validate the usage of the CNWI. For example, CSP 1 102 includes CNWI assignor and validator 106, and CSP N 122 includes CNWI assignor and validator 126.

When a user of CSP 1 102 desires to run an instance of a workload, such as workload instance 1 104, CNWI assignor and validator 106 assigns a CNWI to workload instance 1 104. In an embodiment, this includes one or more calls by CNWI assignor and validator 106 to application programming interfaces (APIs) of CSP 1 102 to generate the CNWI and assign the CNWI to the workload instance at action 108. The CNWI can then be used to communicate with cloud native services (e.g., services provided by CSP 1 102) (not shown in FIG. 1). The user may desire to obtain a first cloud agnostic workload identifier (CAWI) to be used with the workload on this or other CSPs. Workload instance 1 104 calls CAWI assigner 116 at action 110 to get a CAWI associated with the CNWI. CAWI assigner 116 verifies that the CNWI is valid by calling CNWI identity and validator 106 at action 112. If the CNWI is verified, CAWI assigner creates a CAWI associated with the CNWI and sends the CAWI to workload instance 1 104 at action 114. The CAWI can then be used to communicate with other workloads (including one or more instances of those other workloads) running in CSP 1 102 or with other workloads (including one or more instances of those other workloads) running in other CSPs (e.g., with workload instance N 124 running in CSP N 122).

Similarly, when a user of CSP N 122 (which may or may not be the same user that accessed CSP 1 102) desires to run an instance of a workload, such as workload instance N 124, CNWI assignor and validator 126 assigns another CNWI to workload instance N 124. In an embodiment, this includes one or more calls by CNWI assignor and validator 126 to APIs of CSP N 122 to generate this CNWI and assign this CNWI to the workload instance at action 128. This CNWI can then be used to communicate with cloud native services (e.g., services provided by CSP N 122) (not shown in FIG. 1). This user may desire to obtain another cloud agnostic workload identifier (CAWI) to be used with the workload on other CSPs. Workload N 124 calls CAWI assigner 116 at action 130 to get this CAWI. CAWI assigner 116 verifies that this CNWI is valid by calling CNWI identity and validator 126 at action 132. If this CNWI is verified, CAWI assigner 116 creates the CAWI associated with this CNWI and sends this CAWI to workload instance N 124 at action 134. This CAWI can then be used to communicate with other workloads (including one or more instances of those other workloads) running in CSP N 122 or with other workloads (including one or more instances of those other workloads) running in other CSPs (e.g., with workload instance 1 102 running in CSP 1 102). In an embodiment, there may be any number of CNWIs, CAWIs, workloads, and workload instances in computing environment 100. Further, a workload may have multiple workload instances running at a time on one or more CSPs. In an embodiment, a CNWI created in one CSP for a workload instance is translated to a CAWI and applied to the workload instance.

Figure 2:
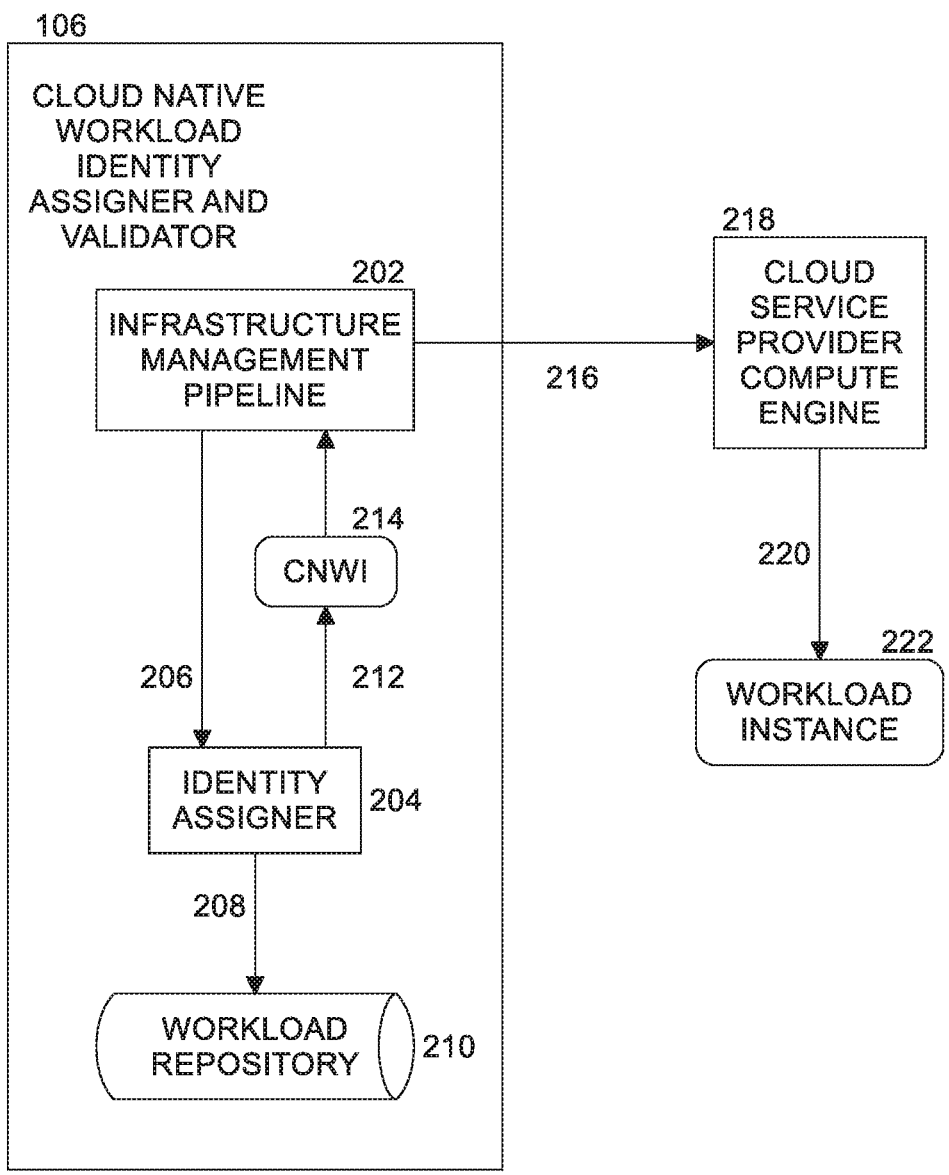
FIG. 2 is a diagram of assigning a cloud native workload identity according to some embodiments.

FIG. 2 is a diagram 200 of assigning a cloud native workload identity (CNWI) 214 according to some embodiments. In one embodiment, CNWI assigner and validator 106 runs at build time or system initialization time for running workloads for a user. Infrastructure management pipeline 202 of CNWI assigner and validator 106 creates necessary computing infrastructure (e.g., compute resources such as virtual machines (VMs) and/or containers) for a workload instance. In one embodiment, infrastructure management pipeline 202 is implemented in Terraform, an open source "infrastructure as code" software tool created by HashiCorp. Terraform enables users to define and provision a datacenter infrastructure using a high-level configuration language known as Hashicorp Configuration Language, or optionally JavaScript object notation (JSON). Infrastructure management pipeline 202 (sometimes referred to as Infrastructure as Code (IaC)) ensures that the IaC specification mirrors the actual infrastructure provided by the CSP. For example, if a new workload instance is added to a service IaC terraform file, the IaC pipeline ensures that the workload is instantiated in the CSP.

Infrastructure as code (IaC) is the process of managing and provisioning cloud computing environments (e.g., data centers) through machine-readable definition files, rather than physical hardware configuration or interactive configuration tools. The cloud computing environment infrastructure managed by this comprises both physical equipment such as "bare-metal" servers as well as virtual machines (VMs) and associated configuration resources. The definitions may be in a version control system. The definitions can use either scripts or declarative definitions, rather than manual processes, but IaC is typically used to promote declarative approaches to infrastructure definition and provisioning. An example of using Terraform to create an AWS Elastic Compute Cloud (EC2) that defines a compute capacity in a cloud computing environment may be found at on the Internet at terraform.io*docs*providers*aws*r*instance.html (with "/" being replaced by "*" to prevent live links).

Infrastructure management pipeline 202 calls identity assigner 204 at action 206 to assign a CNWI 214 to a workload instance. Identity assigner 204 validates at action 208 the computing resources being instantiated by verifying metadata about the workload to be instantiated. Workload repository 210 stores a list of allowed workloads, including metadata describing each workload. In an embodiment, metadata associated with a workload instance is implementation dependent but may include data such as CSP identifier (ID), pod ID, EKS cluster name, etc. In an embodiment, identity assigner 204 checks which CSP is being used, the server of the CSP that the workload is being instantiated on, and checks that the workload instance requesting the CAWI is in fact a CNWI with associated metadata in the workload repository. The metadata includes a service name, service instance ID, and other implementation specific instantiation parameters such as CSP region, Pod, EKS cluster, namespace, etc., all of which are register in the workload repository.

In some embodiments, CNWI 214 comprises a key or secret that can be used to get a session token, depending on the CSP.

If validation is successful, identity assigner 24 returns CNWI 214 to infrastructure management pipeline 202 at action 212. CNWI 214 is assigned at action 216 to workload instance 222 as the workload is instantiated at action 220 by CSP compute engine 218.

Figure 3:
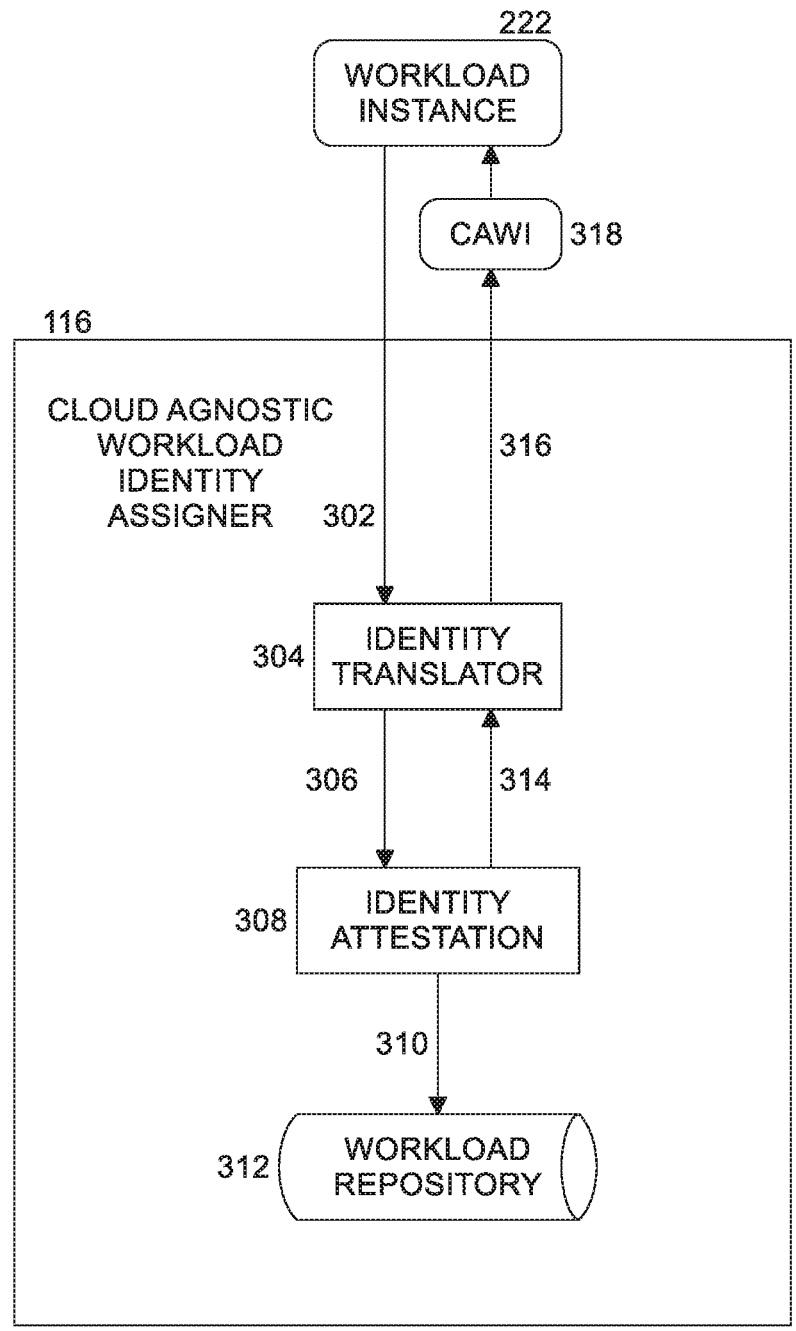
FIG. 3 is a diagram of assigning a cloud agnostic workload identity according to some embodiments.

FIG. 3 is a diagram 300 of assigning a cloud agnostic workload identity (CAWI) 318 according to some embodiments. In one embodiment, CAWI assigner 116 runs at run time (e.g., after instantiation of the workload or whenever a CAWI is needed). As CSP compute engine 218 and the services that comprise the compute engine are initialized, workload instance 222 calls CAWI assigner 116 at action 302 to request a CAWI 318 based at least in part on CNWI 214 assigned to the workload instance. In an embodiment, identity translator 304 validates the request to create CAWI 318 in a CSP-specific manner. For example, for AWS, a call to create CAWI 318 is getCallerIdentity. In an embodiment, identity translator 304 calls identity attestation 308 at action 306 to get details of the metadata for CNWI 214 and the workload from workload repository 312 via action 310. Identity attestation 308 verifies CNWI 214 and provides metadata of the workload instance obtained from the workload repository. Identity attestation 308 returns the validated information to identity translator 304 at action 314. CAWI 318 is created by identity translator 304. In one embodiment, CAWI 318 is a TLS certificate that is given to a workload instance to communicate securely with other workload instances. In this case, the CAWI is embedded in the TLS certificate.

Identity translator 304 returns CAWI 318 to workload instance 222. Workload instance 222 can then use CAWI 318 to communicate with other workload instances in this CSP or other CSPs.

In one example as implemented in AWS, workload instance 222 sends a signed message to identity translator 304, which then gets the signer's identity by calling the CSP (e.g., AWS getCallerIdentity). Upon getting the caller's identity (from the CSP), identity translator 304 confirms that the workload instance 222 is instantiated (as per the process shown in FIG. 2) by checking with identity attestation 308.

Figure 4:
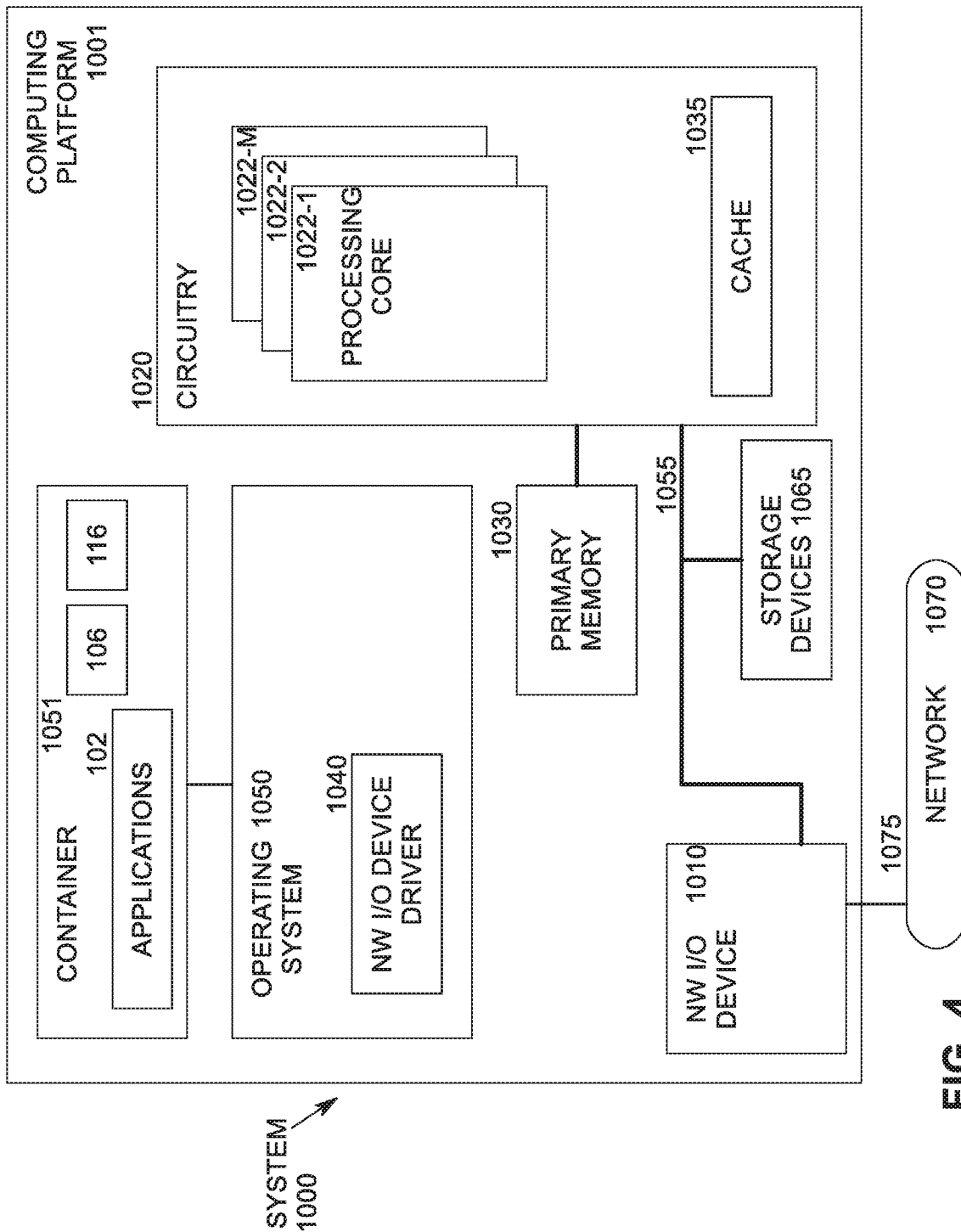
FIG. 4 illustrates an example computing system according to some embodiments.

FIG. 4 illustrates an example computing system 1000 for implementing CNWI assigner and validator 106 and CAWI assigner 116. As shown in FIG. 4, computing system 1000 includes a computing platform 1001 coupled to a network 1070 (which may be the Internet, for example). In some examples, as shown in FIG. 4, computing platform 1001 is coupled to network 1070 via network communication channel 1075 and through at least one network (NW) input/ output (I/O) device 1010. In an embodiment, network I/O device 1010 comprises a switch, a network interface controller (NIC) having one or more destination ports (not shown) connected or coupled to network communication channel 1075. In an embodiment, network communication channel 1075 includes a PHY device (not shown). In an embodiment, network I/O device 1010 includes an Ethernet NIC. Network I/O device 1010 transmits data packets from computing platform 1001 over network 1070 to other destinations and receives data packets from other destinations for forwarding to computing platform 1001.

According to some examples, computing platform 1001, as shown in FIG. 4, includes circuitry 1020, primary memory 1030, operating system (OS) 1050, NW I/O device driver 1040, at least one application 102 running in a container 1051, CNWI assigner and validator 106 and CAWI assigner 116, and one or more storage devices 1065. In one embodiment, OS 1050 is Linux™. In another embodiment, OS 1050 is Windows® Server. Other OSs may also be used. Network I/O device driver 1040 operates to initialize and manage I/O requests performed by network I/O device 1010. In an embodiment, packets and/or packet metadata transmitted to network I/O device 1010 and/or received from network I/O device 1010 are stored in one or more of primary memory 1030 and/or storage devices 1065. In one embodiment, at least one application 102 is a database management system.

In one embodiment, CNWI assigner and validator 106 and CAWI assigner 116 runs in a container 1051. In another embodiment, CNWI assigner and validator 106 and CAWI assigner 116 is implemented in circuitry 1020.

In at least one embodiment, storage devices 1065 may be one or more of hard disk drives (HDDs) and/or solid-state drives (SSDs). In an embodiment, storage devices 1065 may be non-volatile memories (NVMs). In some examples, as shown in FIG. 4, circuitry 1020 may communicatively couple to network I/O device 1010 via communications link 1055. In one embodiment, communications link 1055 is a peripheral component interface express (PCIe) bus conforming to version 3.0 or other versions of the PCIe standard published by the PCI Special Interest Group (PCI-SIG).

In some examples, operating system 1050, NW I/O device driver 1040, CNWI assigner and validator 106 and CAWI assigner 116, container 1051, and application 102 are implemented, at least in part, via cooperation between one or more memory devices included in primary memory 1030 (e.g., volatile or non-volatile memory devices), storage devices 1065, and elements of circuitry 1020 such as processing cores 1022-1 to 1022-$m$, where "m" is any positive whole integer greater than 2. In an embodiment, OS 1050, container 1051, NW I/O device driver 1040, CNWI assigner and validator 106 and CAWI assigner 116, VM 1061 and application 102 are executed by one or more processing cores 1022-1 to 1022-$m$.

In some examples, computing platform 1001, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 1001 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 1020 having processing cores 1022-1 to 1022-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 1020 may include at least one cache 1035 to store data.

According to some examples, primary memory 1030 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 1030 may include one or more hard disk drives within and/or accessible by computing platform 1001.

Figure 5:
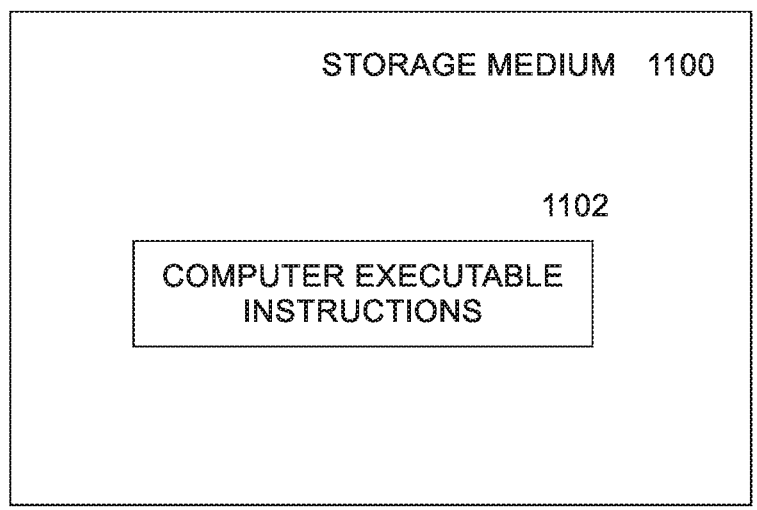
FIG. 5 illustrates an example of a storage medium.

FIG. 5 illustrates an example of a storage medium 1100. Storage medium 1100 may comprise an article of manufacture. In some examples, storage medium 1100 includes any non-transitory tangible computer readable medium or machine readable medium, such as an optical, magnetic or semiconductor storage. Storage medium 1100 may store various types of computer executable instructions, such as instructions 1102 to implement logic flows and systems described above in FIGS. 1 through 3. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
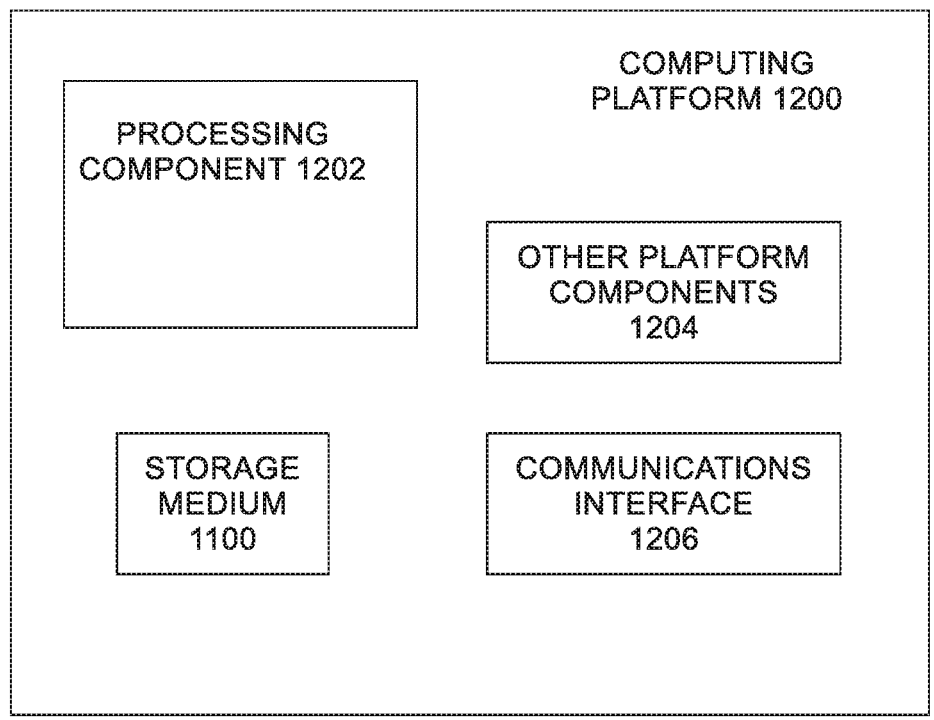
FIG. 6 illustrates another example computing platform.

FIG. 6 illustrates an example computing platform 1200. In some examples, as shown in FIG. 6, computing platform 1200 may include a processing component 1202, other platform components 1204 and/or a communications interface 1206.

According to some examples, processing component 1202 may execute processing operations or logic for instructions stored on storage medium 1100 (and described above with reference to FIGS. 1 through 3). Processing component 1202 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1204 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1206 may include logic and/or features to support a communication interface. For these examples, communications interface 1206 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1200, including logic represented by the instructions stored on storage medium 1100 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples include an article of manufacture or at least one computer-readable medium. A computer-readable medium includes a non-transitory storage medium to store logic. In some examples, the non-transitory storage medium includes one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus, comprising:
a processing device; and
a memory device coupled to the processing device, the memory device having instructions stored thereon that, in response to execution by the processing device, cause the processing device to:
create a cloud native workload identity (CNWI) and assign the CNWI to an instance of a workload to be instantiated in a cloud computing environment of a cloud service provider (CSP);
receive a request from the instance of the workload to create a cloud agnostic workload identity (CAWI) based on the CNWI;
validate the request to create the CAWI by:
requesting metadata associated with the CNWI from a workload repository, wherein the metadata associated with the CNWI comprises data identifying the CSP of the instance of the workload; and
verifying validity of the CNWI with the metadata from the workload repository by verifying that the CNWI of the instance of the workload is associated with the CSP;
translate the CNWI into a CAWI and assign the CAWI to the workload instance; and
use the CAWI by the workload instance to communicate with other workloads in the CSP or other CSPs.
2. The apparatus of claim 1, comprising instructions to create the CNWI at build time for running workloads on the cloud computing environment of the CSP.

3. The apparatus of claim 1, comprising instructions to create computing infrastructure in the cloud computing environment of the CSP for the workload instance.

4. The apparatus of claim 3, comprising instructions to validate the computing infrastructure to be created by verifying metadata about the workload to be instantiated stored in a workload repository.

5. The apparatus of claim 1, wherein the CNWI comprises at least one of a cryptographic key or secret used to obtain a session token.

6. The apparatus of claim 5, wherein the CNWI is specific to the CSP and cannot be used in a cloud computing environment of another CSP, and wherein the request identifies the CSP.

7. The apparatus of claim 1, wherein the CAWI comprises a transport layer security (TLS) certificate assigned to the workload instance to communicate securely with other workload instances.

8. The apparatus of claim 1, wherein the CAWI is not specific to the CSP and can be used in a cloud computing environment of another CSP.

9. The apparatus of claim 1, comprising instructions to translate the CNWI into the CAWI at run time for the workload instance to communicate securely with other workload instances.

10. A computer-implemented method, comprising:
   creating a cloud native workload identity (CNWI) and assigning the CNWI to an instance of a workload to be instantiated in a cloud computing environment of a cloud service provider (CSP);
   receiving a request from the instance of the workload to create a cloud agnostic workload identity (CAWI) based on the CNWI;
   validating the request to create the CAWI by:
      requesting metadata associated with the CNWI from a workload repository, wherein the metadata associated with the CNWI comprises data identifying the CSP of the instance of the workload; and
      verifying validity of the CNWI with the metadata from the workload repository by verifying that the CNWI of the instance of the workload is associated with the CSP;
   translating the CNWI into the CAWI and assigning the CAWI to the workload instance; and
   using the CAWI by the workload instance to communicate with other workloads in the CSP or other CSPs.

11. The computer-implemented method of claim 10, comprising creating the CNWI at build time for running workloads on the cloud computing environment of the CSP.

12. The computer-implemented method of claim 10, comprising creating computing infrastructure in the cloud computing environment of the CSP for the workload instance.

13. The computer-implemented method of claim 12, comprising validating the computing infrastructure to be created by verifying metadata about the workload to be instantiated stored in a workload repository.

14. The computer-implemented method of claim 10, wherein the CNWI comprises at least one of a cryptographic key or secret used to obtain a session token.

15. The computer-implemented method of claim 14, wherein the CNWI is specific to the CSP and cannot be used in a cloud computing environment of another CSP, and wherein the request identifies the CSP.

16. The computer-implemented method of claim 10, wherein the CAWI comprises a transport layer security (TLS) certificate assigned to the workload instance to communicate securely with other workload instances.

17. The computer-implemented method of claim 10, wherein the CAWI is not specific to the CSP and can be used in a cloud computing environment of another CSP.

18. The computer-implemented method of claim 10, comprising translating the CNWI into the CAWI at run time for the workload instance to communicate securely with other workload instances.

19. At least one tangible non-transitory machine-readable medium comprising a plurality of instructions that in response to being executed by a processor in a computing system cause the processor to:
   create a cloud native workload identity (CNWI) and assign the CNWI to an instance of a workload to be instantiated in a cloud computing environment of a cloud service provider (CSP);
   receive a request from the instance of the workload to create a cloud agnostic workload identity (CAWI) based on the CNWI;
   validate the request to create the CAWI by:
      requesting metadata associated with the CNWI from a workload repository, wherein the metadata associated with the CNWI comprises data identifying the CSP of the instance of the workload; and
      verifying validity of the CNWI with the metadata from the workload repository by verifying that the CNWI of the instance of the workload is associated with the CSP;
   translate the CNWI into the CAWI and assign the CAWI to the workload instance; and
   use the CAWI by the workload instance to communicate with other workloads in the CSP or other CSPs.

20. The at least one tangible non-transitory machine-readable medium of claim 19, comprising instructions to create the CNWI at build time for running workloads on the cloud computing environment of the CSP.

21. The at least one tangible non-transitory machine-readable medium of claim 19, comprising instructions to create computing infrastructure in the cloud computing environment of the CSP for the workload instance.

22. The at least one tangible non-transitory machine-readable medium of claim 21, comprising instructions to validate the computing infrastructure to be created by verifying metadata about the workload to be instantiated stored in a workload repository.

* * * * *